(12) United States Patent  
Cook et al.

(10) Patent No.: US 7,836,782 B2
(45) Date of Patent: Nov. 23, 2010

(54) MOTOR PUMP TORQUE TRANSDUCER

(75) Inventors: Andrew Cook, New Hudson, MI (US); Matthew Kottman, Walled Lake, MI (US); Richard Louis Wurst, Commerce Township, MI (US); Hugh Larsen, Milford, MI (US)

(73) Assignee: Michigan Scientific Corporation, Milford, MI (US)

( * ) Notice: Subject to any disclaimer, the term of this patent is extended or adjusted under 35 U.S.C. 154(b) by 360 days.

(21) Appl. No.: 12/124,216

(22) Filed: May 21, 2008

(65) Prior Publication Data

US 2009/0320614 A1 Dec. 31, 2009

(51) Int. Cl.
*G01L 1/22* (2006.01)

(52) U.S. Cl. .............................. 73/862.338; 73/862.331

(58) Field of Classification Search ................................ 73/862.331–862.338
See application file for complete search history.

(56) References Cited

U.S. PATENT DOCUMENTS

| | | | | |
|---|---|---|---|---|
| 4,712,433 | A | * | 12/1987 | Hochstein et al. ...... 73/862.334 |
| 4,765,192 | A | * | 8/1988 | Hase et al. ............. 73/862.334 |
| 4,942,343 | A | * | 7/1990 | Orlicki et al. ................... 318/6 |
| 4,972,725 | A |   | 11/1990 | Choisnet |
| 5,394,760 | A |   | 3/1995 | Persson et al. |
| 5,442,956 | A |   | 8/1995 | Persson |
| 6,020,737 | A | * | 2/2000 | Wyss ...................... 324/207.25 |
| 6,269,702 | B1 |  | 8/2001 | Lambson |
| 6,581,477 | B1 |  | 6/2003 | Berger et al. |
| 6,708,557 | B2 |  | 3/2004 | Moskwa et al. |
| 6,817,253 | B2 |  | 11/2004 | Gandrud |
| 7,115,038 | B2 |  | 10/2006 | Agner |
| 2006/0230591 | A1 |  | 10/2006 | Chitty et al. |
| 2007/0293152 | A1 | * | 12/2007 | Rosen et al. ................... 455/39 |

* cited by examiner

*Primary Examiner*—Max Noori
(74) *Attorney, Agent, or Firm*—Young Basile

(57) ABSTRACT

An apparatus can be assembled between a pump and a motor driving the pump for a measuring torque and speed. The apparatus can include a housing having a motor attachment port and a pump attachment port. A primary coil is supported by the housing. A shaft has a first outer end and second outer end and an inner portion located within the housing. The first and second outer ends are connectible to a motor and a pump to suspend the shaft between the motor and the pump only by the outer ends of the shaft. A strain gauge transducer component is operably associated with the shaft. A secondary induction coil is mounted on the shaft and is located sheathed within the primary coil for providing power to the strain gauge transducer component. A wireless output of readings from the strain gauge transducer component is provided.

19 Claims, 5 Drawing Sheets

MOTOR PUMP TORQUE TRANSDUCER

FIELD OF THE INVENTION

The present invention relates to apparatus for measuring the torsional forces acting on a shaft and, in particular, a power shaft for a hydraulic power unit.

BACKGROUND

Hydraulic power units are used to convert and transmit power between devices and many types of equipment. A hydraulic pump can convert the power of an electric motor into a flow of high pressure hydraulic fluid that can be used for performing a useful function in a machine. Hydraulic power units are typically used in aircraft to control air foils, valves and actuators. Shaft rotation speed and shaft torque are typically measured to determine performance of the hydraulic power units and to insure that new hydraulic power units meet design and manufacturing specifications. One common technology available for measuring the torque experienced by a rotating shaft includes a series of strain gauges bonded in strategic locations to the shaft. The electrical signals that are produced by the strain gauges are often transferred from the rotating shaft to the fixed portion of a machine through a series of slip rings or inductive coils.

SUMMARY

The present invention discloses an apparatus to be assembled between a pump and a motor driving the pump for measuring torque and speed. The apparatus can include a housing having a motor attachment port and a pump attachment port. A primary coil is supported by the housing. At least one shaft is provided having a first outer end adjacent the motor attachment port of the housing for attachment to the motor, and a second outer end adjacent the pump attachment port for attachment to the pump. An inner portion of the at least one shaft is located within the housing. The at least one shaft has evenly angularly spaced ridges and grooves formed on an axially and circumferentially extending exterior portion of the at least one shaft. A strain gauge transducer component is operably associated with the at least one shaft. A secondary induction coil sheaths the inner portion of the at least one shaft while being mounted on an external surface of the shaft. The secondary induction coil is located sheathed within the primary coil and operably connected to power the strain gauge transducer component. A Hall effect speed sensor is supported by the housing for sensing passage of the evenly angularly spaced ridges and grooves formed on the exterior portion of the at least one shaft.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
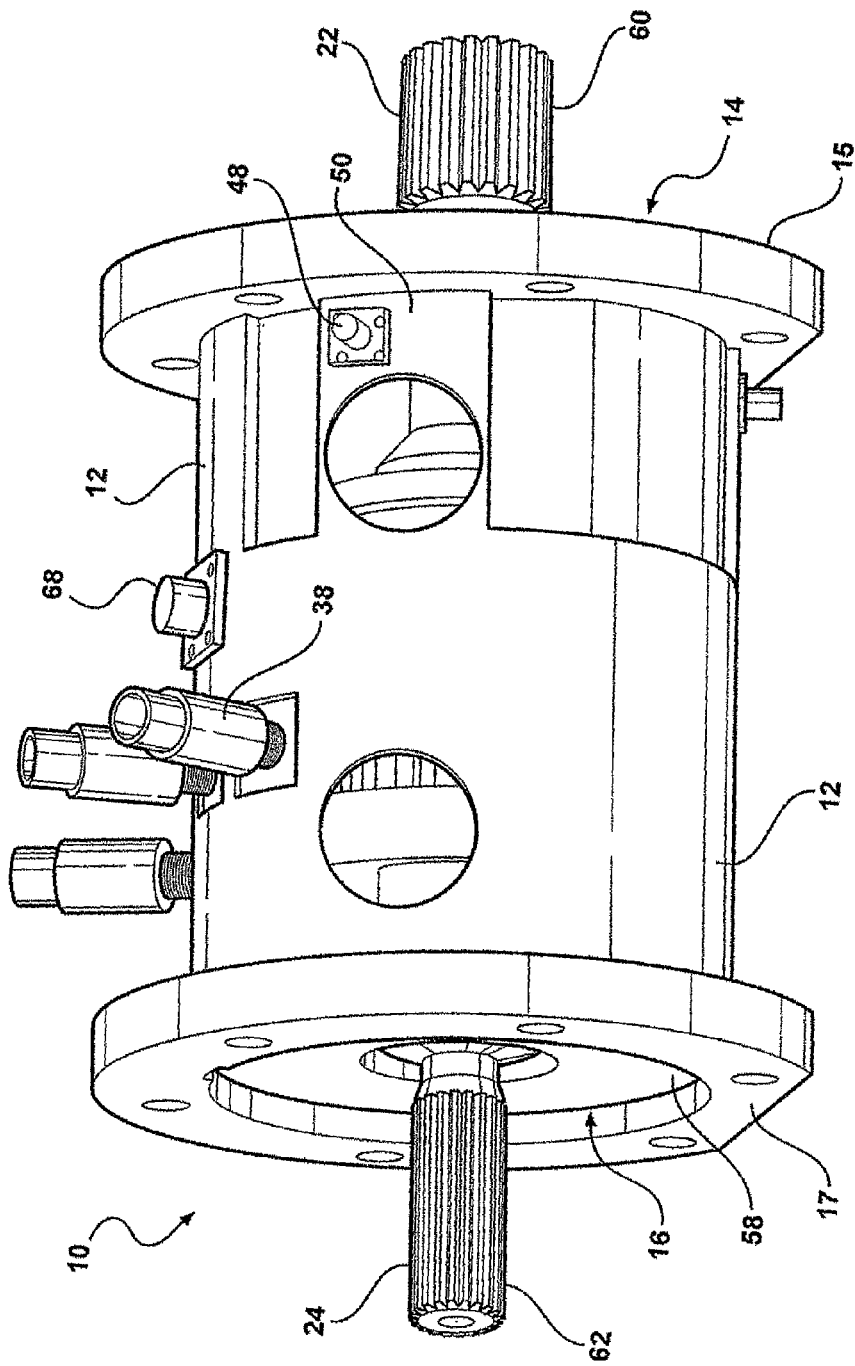
FIG. 1 is an assembled perspective view of an apparatus to be assembled between a pump and a motor driving the pump for measuring torque and speed according to an embodiment of the invention.
Figure 2:
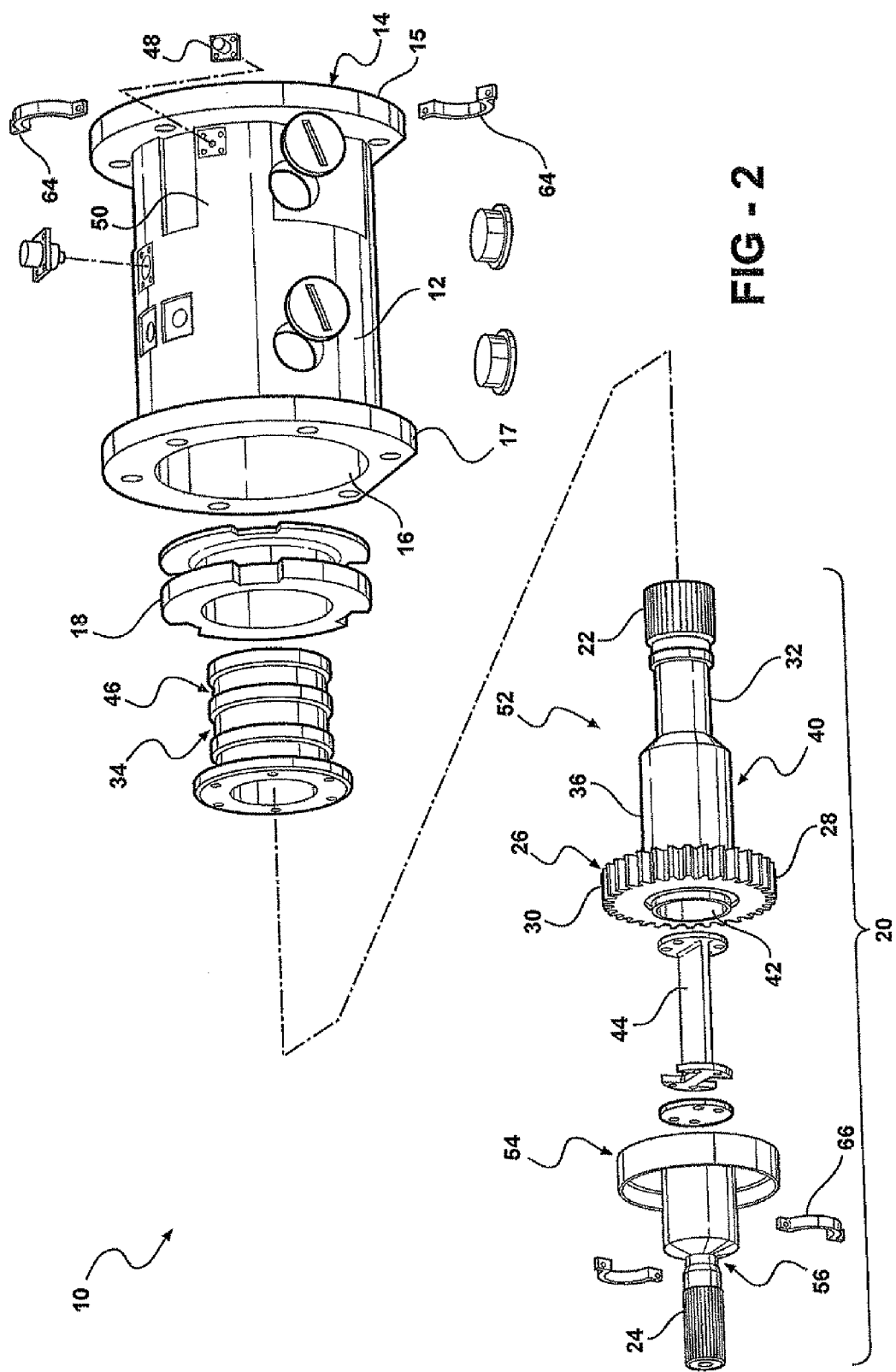
FIG. 2 is an exploded perspective view of the assembly of FIG. 1.
Figure 5:
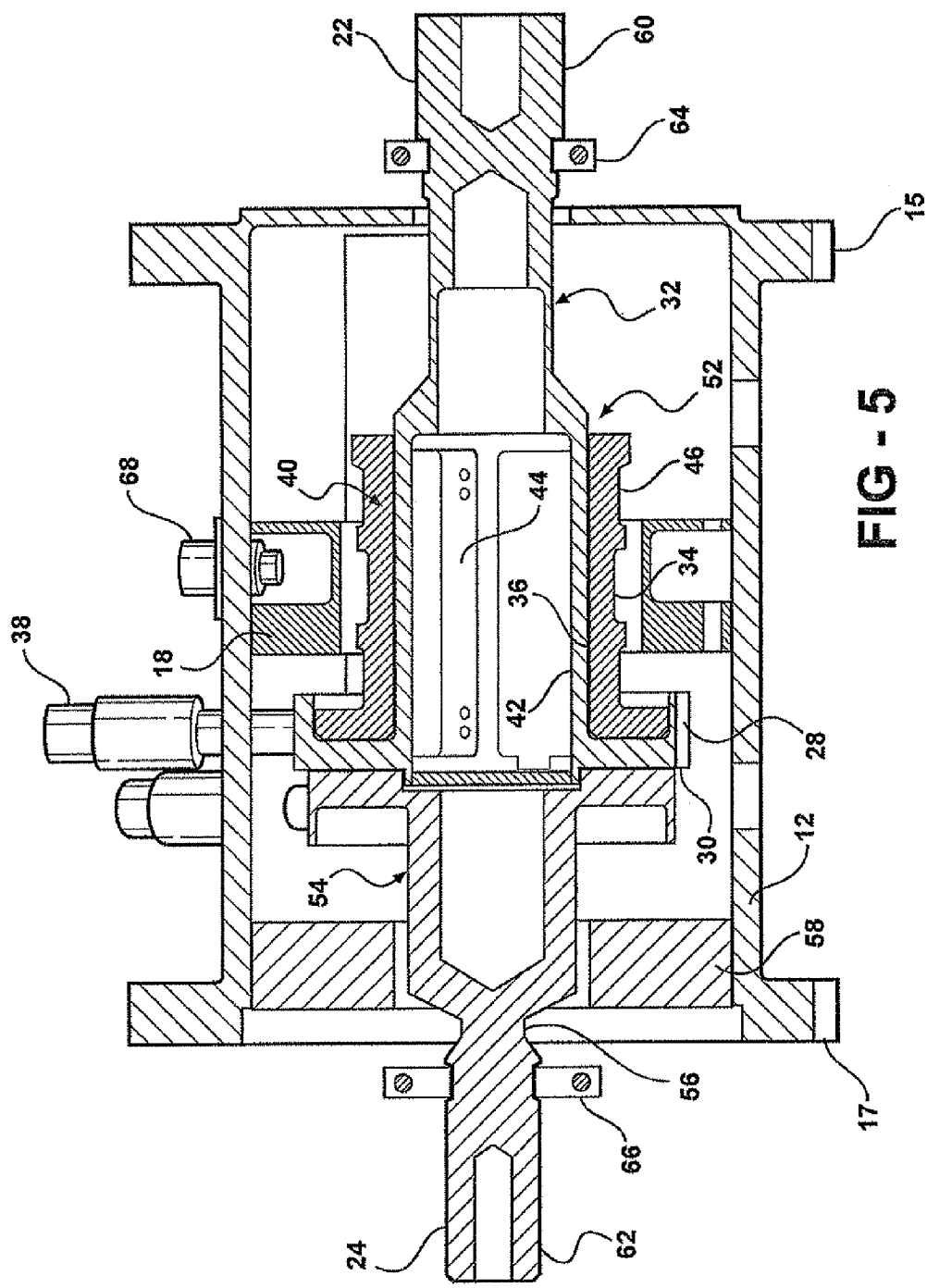
FIG. 5 is a simplified cross-sectional view of the assembled apparatus illustrated in FIG. 1.

Referring now to FIGS. 1, 2, and 5, an apparatus 10 is illustrated to be assembled between a pump and motor driving the pump for measuring torque and speed. The apparatus 10 can include a housing 12 having a motor attachment port or end 14 and a pump attachment port or end 16.

A first mounting surface 15 with a plurality of circumferentially spaced fastener receiving bores formed at the motor attachment port 14 of the housing 12. A similar mounting surface 17 is formed at the opposed end of the housing at the surrounding the motor pump attachment port or end 16. The mounting surface 17 likewise includes a plurality of threaded bores. The bores in the first and second mounting surfaces 15 and 17 receive fasteners which fixedly attach the first and second mounting surfaces 15 and 17 to complimentary formed mounting surfaces and aligned bores, formed in the motor and the pump, respectively for fixedly attaching and supporting the housing 12 between the motor and the pump.

Figure 3:
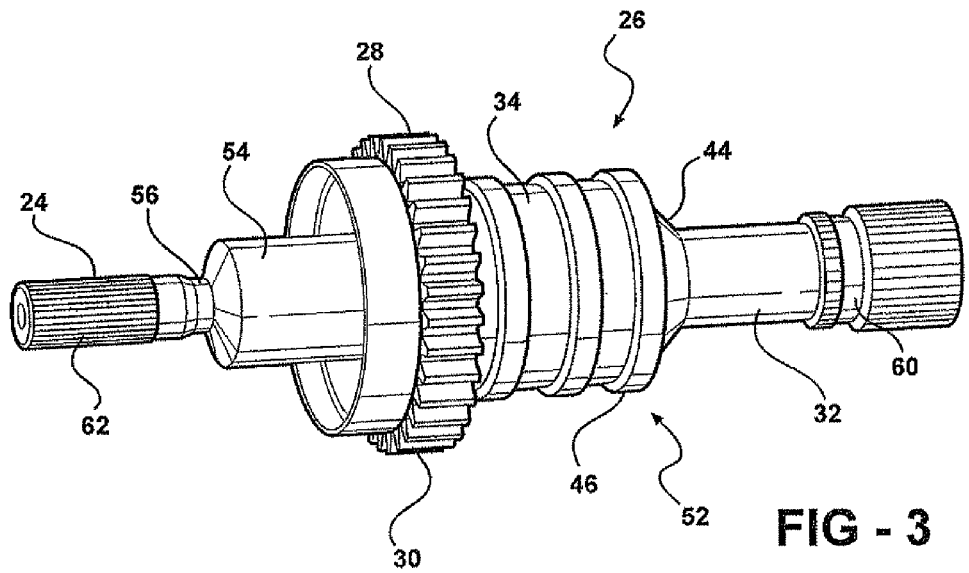
FIG. 3 is a perspective view of the partially assembled shaft of the apparatus of FIGS. 1 and 2 having outer splined ends, evenly angularly spaced ridges and grooves formed on an axially and circumferentially extending exterior portion of the shaft, an assembled secondary induction coil, and a strain gauge transducer component mounted to the shaft.
Figure 4:
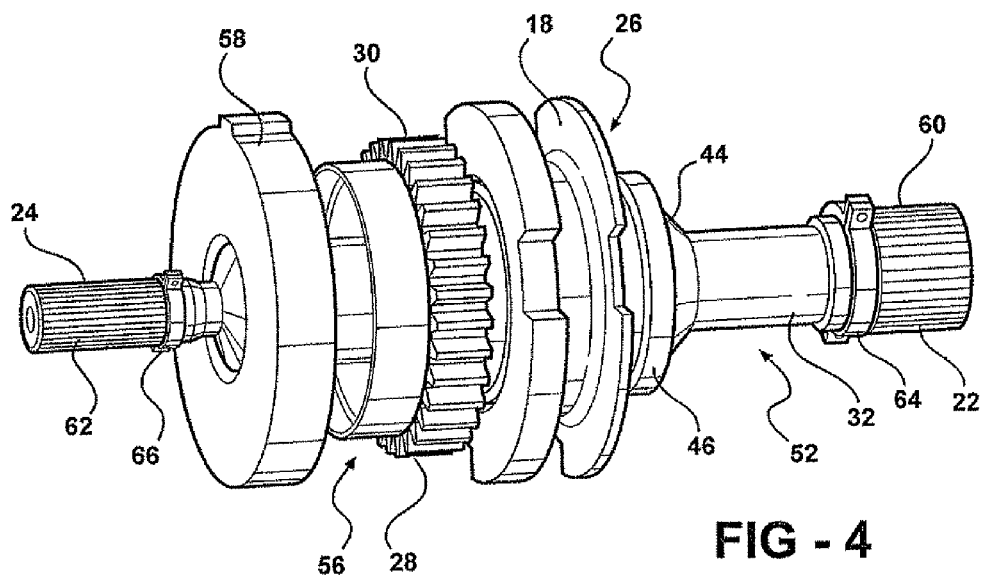
FIG. 4 is a perspective view of the partially assembled apparatus of FIGS. 1-3 with the addition of a primary coil, containment ring, and clamps.

A primary coil 18 is supported by the housing 12 either externally or internally. At least one shaft 20 is provided having a first outer end 22 adjacent the motor attachment port 14 of the housing 12 for attachment to a motor. A second outer end 24 of the shaft 20 is located adjacent the pump attachment port 16 of the housing 12 for attachment to a pump, not shown. An inner portion 26 of the shaft 20 is located within the housing 12. Angularly spaced ridges and grooves 28, which can be evenly angularly spaced, are formed on an axially and circumferentially extending exterior portion 30 of the shaft 20. As best seen in FIGS. 2-4, a strain gauge transducer component 32 is operably associated with or mounted to the shaft 20. A secondary induction coil 34 is mounted on an external surface 36 of the shaft 20 sheathing the inner portion 26 of the shaft 20. The secondary induction coil 34 is located sheathed within the primary coil 18 as best seen in FIG. 5. The secondary induction coil 34 is operably connected to power the strain gauge transducer component 32. As best seen in FIGS. 1 and 5, a Hall effect speed sensor 38 is supported by the housing 12 for sensing passage of the angularly spaced ridges and grooves 28 formed on the exterior portion 30 of the shaft 20.

As best seen in FIGS. 2 and 5, the shaft 20 can include a first axial portion 40 having a hollow interior 42 extending along the inner portion 26. A telemetry electronics module 44 is located within the hollow interior 42 of the shaft 20. A telemetry transmitting antenna 46 can be mounted on an external surface 36 of the shaft 20. The telemetry transmitting antenna 46 can sheath the first axial portion 40 of the shaft 20. The telemetry transmitting antenna 46 can be mounted in combination with the second induction coil 34 if desired. The secondary coil 34 is operably connected to power the telemetry electronics module 44 and the telemetry transmitting antenna 46. A telemetry receiving antenna signal connector 48 can be supported by the housing 12 for receiving signals from the telemetry transmitting antenna 46. The telemetry receiving antenna signal connector 48 can be located on an exterior surface 50 of the housing 12, if desired.

As best seen in FIGS. 2 and 5, the at least one shaft 20 can include a first shaft portion 52 and a separate second shaft portion 54 defining an opening allowing access to the hollow interior 42 of the shaft 20. The shaft 20 can also include a replaceable break away notch or section 56 for breaking in response to a jammed pump. As best seen in FIGS. 1, 4, and 5, a containment ring 58 can be located adjacent the pump attachment port 16 of the housing 12. A splined end 60,62 at each outer end 22,24 of the shaft 20 is provided for connection to the pump and to the motor, both not shown.

As best seen in FIGS. 4 and 5, a clamp 64, 66 can be connectible to each outer end 22, 24 of the shaft 20 for limiting axial shifting movement along each splined end 60,62. When assembled to the pump and motor, the shaft 20 is suspended between the motor and the pump only by the splined outer ends 60, 62. As best seen in FIG. 5, the shaft 20 is sheathed within the housing 12 while not being supported by the housing 12.

The apparatus 10 provides a wireless output of readings from the strain gauge transducer component 32. The wireless output of the strain gauge transducer component 32 can be a radio frequency output, if desired. By way of example and not limitation, the motor provided can be an electric motor, and the pump provided can be a hydraulic pump. The apparatus 10 can provide an electric powered pump for controlling air foils, valves, and actuators of an aircraft, if desired. As best seen in FIGS. 1 and 5, induction power connection 68 can be supported by the housing 12 or located on an exterior surface 50 of the housing 12 for providing power to the primary coil 18.

In operation, power can be provided to the primary coil 18 through the induction power connection 68 located on an exterior surface 50 of the housing 12. Power is induced in the secondary induction coil 34 located sheathed within the primary coil 18. The secondary induction coil 34 is mounted on the external surface 36 of the shaft 20 sheathing the inner portion 26 of the shaft 20. The secondary induction coil 34 is operably connected to power the strain gauge transducer component 32, the telemetry electronics module 44 located within the hollow interior 42 of the shaft 20 and the telemetry antenna 46 mounted on the external surface 36 of the shaft 20. The torque measured by the strain gauge transducer component 32 is then transmitted by analog or digital radio frequency signals through the electronics module 44 and the telemetry transmitting antenna 46 to the telemetry receiving antenna 47 that is connected to connector 48 supported by the housing 12 or located on the exterior surface 50 of the housing 12 for receiving signals from the telemetry transmitting antenna 46. As the shaft 20 rotates, the Hall effect speed sensor 38 supported by the housing 12, or located on an exterior surface 50 of the housing 12 senses passage of the evenly angularly spaced ridges and grooves 28 formed on the exterior portion 30 of the shaft 20. The shaft 20 includes splined outer ends 60,62 for connection to the pump and to the motor. The shaft 20 is suspended between the motor and the pump only by the splined outer ends 60,62 and is sheathed within the housing 12; while not being supported by the housing 12. Clamps 64, 66 are connectible to each splined outer end 60,62 of the shaft 20 for limiting axial shifting movement along each splined end 60, 62. The telemetry transmitting antenna 46 provides a wireless output of readings from the strain gauge transducer component 32 to the telemetry receiving antenna 47 connected to connector 48. If desired, the wireless output can be a radio frequency output. The shaft 20 can include the first shaft portion 52 and the separate second shaft portion 54 defining an opening allowing access to the hollow interior 42 of the shaft 20. The shaft 20 can also include the replaceable break away notch or section 56 for controlled breakage in response to a jammed pump. The containment ring 58 can be mounted to be located adjacent the pump attachment port 16 of the housing 12.

Figure 6:
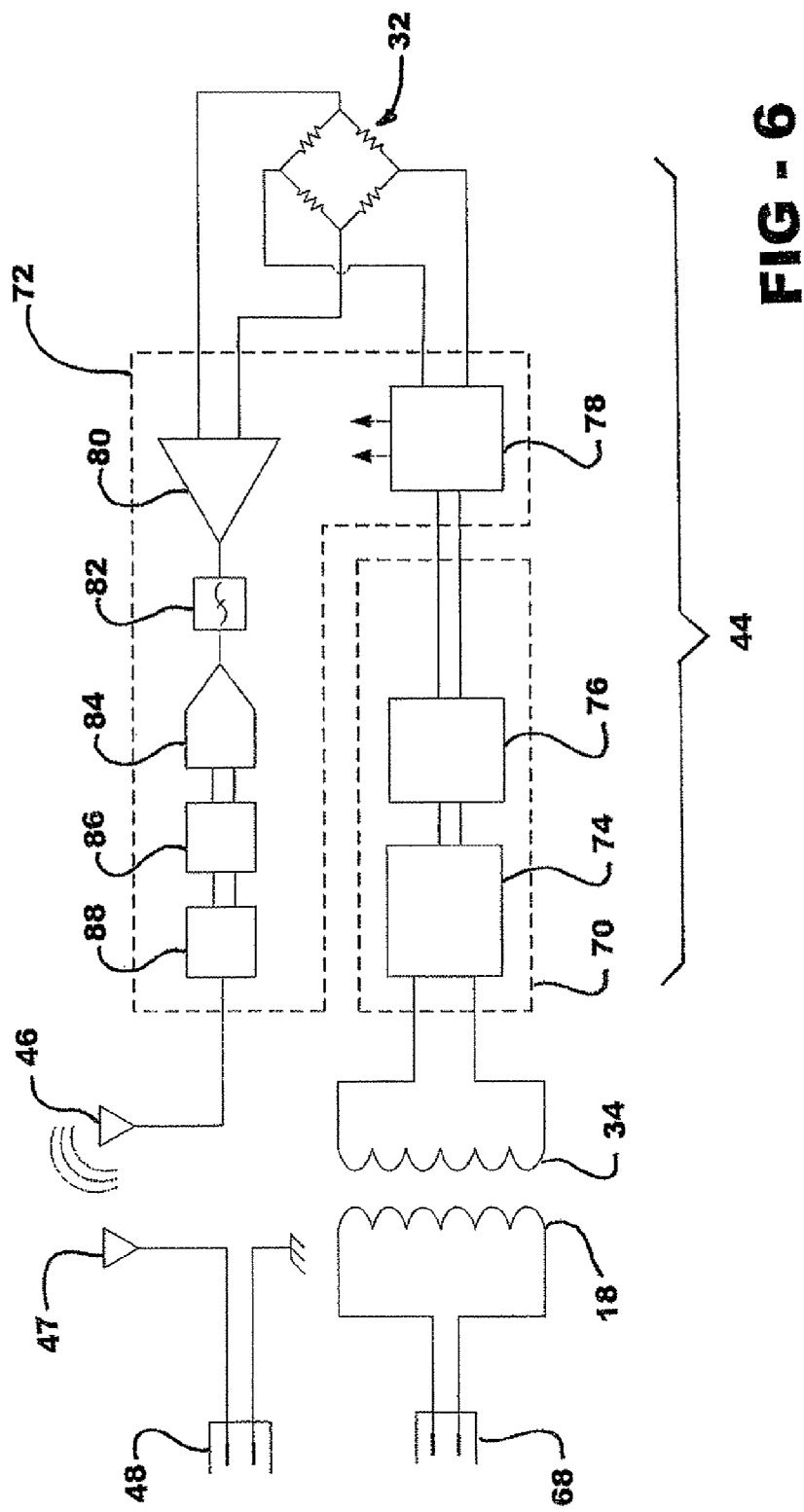
FIG. 6 is a simplified electrical block diagram schematically illustrating an embodiment of the invention.

Referring now to FIG. 6, by way of example and not limitation, an electrical schematic illustrates one embodiment of the invention. The primary coil 18 can be powered through induction power connection 68. Power is induced in the secondary induction coil 34 to provide power to the electronics module 44. The electronics module 44 can include an induction power regulator 70 and the wireless telemetry transmitter 72. The induction power regulator 70 can include a power conditioner 74 and a power regulator 76. The induction power regulator 70 delivers power to the wireless telemetry transmitter 72. The transmitter 72 can include a power regulator 78 supplying power to the strain gauge transducer component 32. The strain gauge transducer component 32 is connected to a gain amplifier 80. The output from the gain amplifier 80 can be fed through a low-pass 2-pole Bessel filter 82. The output from the Bessel filter 82 is directed to an analog/digital converter 84. The output from the analog/digital converter 84 is passed through a micro controller 86. The output from the micro controller 86 is connected to a radio frequency integrated chip 88. Output from the radio frequency integrated chip 88 is delivered to the telemetry transmitting antenna 46. Signals transmitted by the telemetry transmitting antenna 46 are received by the telemetry receiving antenna 47. The telemetry receiving antenna can be connected to signal connector 48.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus to be assembled between a pump and a motor driving the pump for measuring torque and speed comprising:

a housing having a motor attachment port and a pump attachment port;

a primary coil supported by the housing;

at least one shaft having a first outer end adjacent the motor attachment port of the housing for attachment to a motor, a second outer end adjacent the pump attachment port for attachment to a pump, and an inner portion located within the housing, the at least one shaft having angularly spaced ridges and grooves formed on an axially and circumferentially extending exterior portion of the at least one shaft;

a strain gauge transducer component operably associated with the at least one shaft;

a secondary induction coil sheathing the inner portion of the at least one shaft and mounted on an external surface of the at least one shaft, the secondary induction coil located sheathed within the primary coil and operably connected to power the strain gauge transducer component; and a speed sensor supported by the housing for sensing passage of the angularly spaced ridges and grooves formed on the exterior portion of the at least one shaft.

2. The apparatus of claim 1 further comprising:
a first axial portion of the at least one shaft having a hollow interior extending along the inner portion;
the strain gauge transducer component including a power regulator, an amplifier, and a telemetry electronics module located within the hollow interior of the at least one shaft;
a telemetry transmitting antenna coupled to the telemetry electronics module, the telemetry transmitting antenna sheathing the first axial portion of the at least one shaft and mounted on an external surface of the at least one shaft;
the secondary induction coil operably connected to power the telemetry electronics module and the telemetry transmitting antenna; and
a telemetry receiving antenna connected to a signal connector located on an exterior surface of the housing for receiving signals from the telemetry transmitting antenna.

3. The apparatus of claim 2 wherein the at least one shaft further comprises:
a first shaft portion and a separate second shaft portion defining an opening allowing access to the hollow interior of the at least one shaft.

4. The apparatus of claim 1, wherein the at least one shaft includes a break-away section for breaking in response to a jammed pump.

5. The apparatus of claim 1 further comprising:
a containment ring located adjacent the pump attachment port of the housing.

6. The apparatus of claim 1 further comprising:
a splined end at each outer end of the at least one shaft for connection to the pump and to the motor.

7. The apparatus of claim 6 further comprising:
a clamp connectible to each outer end of the at least one shaft for limiting axial shifting movement along each splined end.

8. The apparatus of claim 6, wherein the at least one shaft is suspended between the motor and the pump only by the splined outer ends.

9. The apparatus of claim 1, wherein the at least one shaft is sheathed within the housing while not being supported by the housing.

10. The apparatus of claim 1 further comprising:
mounting surfaces provided on the housing at each of the motor attachment port and the pump attachment port attachable to complementary mounting surfaces on the motor and the pump for supporting the housing between the motor and the pump.

11. The apparatus of claim 10, wherein the at least one shaft is suspended between the motor and the pump only by the splined outer ends.

12. The apparatus of claim 1 further comprising:
a wireless output of readings from the strain gauge transducer component.

13. The apparatus of claim 12, wherein the wireless output is a radio frequency output.

14. An apparatus to be assembled between a pump and a motor driving the pump for measuring torque and speed comprising:
a housing having a motor attachment port and a pump attachment port;
a primary coil supported by the housing;
at least one shaft having a first outer end adjacent the motor attachment port of the housing for attachment to a motor, a second outer end adjacent the pump attachment port for attachment to a pump, and an inner portion located within the housing, the at least one shaft having angularly spaced ridges and grooves formed on an axially and circumferentially extending exterior portion of the at least one shaft, the at least one shaft sheathed within the housing while not being supported by the housing, a splined end at each first and second outer end of the at least one shaft for connection to the pump and to the motor, the at least one shaft suspended between the motor and the pump only by the splined outer ends;
a strain gauge transducer component operably associated with the at least one shaft;
a secondary induction coil sheathing the inner portion of the at least one shaft and mounted on an external surface of the at least one shaft, the secondary induction coil located sheathed within the primary coil and operably connected to power the strain gauge transducer component;
a wireless output of readings from the strain gauge transducer component; and
a speed sensor supported by the housing for sensing passage of the angularly spaced ridges and grooves formed on the exterior portion of the at least one shaft.

15. The apparatus of claim 14, wherein the wireless output is a radio frequency output.

16. The apparatus of claim 14 further comprising:
a clamp connectible to each first and second outer end of the at least one shaft for limiting axial shifting movement along each splined end.

17. The apparatus of claim 14 further comprising:
a break-away section of the at least one shaft for breaking in response to a jammed pump.

18. The apparatus of claim 14 wherein the wireless output further comprises:
a telemetry electronics module supported by the at least one shaft;
a telemetry transmitting antenna coupled to the telemetry electronics module and supported by the at least one shaft; and
the secondary induction coil operably connected to power the telemetry electronics module and the telemetry transmitting antenna.

19. An apparatus to be assembled between a pump and a motor driving the pump for measuring torque and speed comprising:
a housing having a motor attachment port and a pump attachment port;
a primary coil supported by the housing;
at least one shaft having a first outer end adjacent the motor attachment port of the housing for attachment to a motor, a second outer end adjacent the pump attachment port for attachment to a pump, and an inner portion located within the housing, the at least one shaft having angularly spaced ridges and grooves formed on an axially and circumferentially extending exterior portion of the at least one shaft, a first axial portion of the at least one shaft having a hollow interior extending along the inner portion, the at least one shaft sheathed within the housing while not being supported by the housing, a splined end at each first and second outer end of the at least one shaft for connection to the pump and to the motor, the at least one shaft suspended between the motor and the pump only by the splined outer ends;

a telemetry electronics module located within the hollow interior of the at least one shaft;

a strain gauge transducer component operably associated with the at least one shaft;

a secondary induction coil and telemetry transmitting antenna sheathing the inner portion of the at least one shaft and mounted on an external surface of the at least one shaft, the secondary induction coil located sheathed within the primary coil and operably connected to power the strain gauge transducer component, the telemetry electronics module, and the telemetry transmitting antenna;

a telemetry receiving antenna for receiving signals from the telemetry transmitting antenna, and connected to an associated signal connector located on an exterior surface of the housing;

an induction power connection located on an exterior surface of the housing for providing power to the primary coil; and a speed sensor supported by the housing for sensing passage of the evenly angularly spaced ridges and grooves formed on the exterior portion of the at least one shaft.

* * * * *